Figure 1:
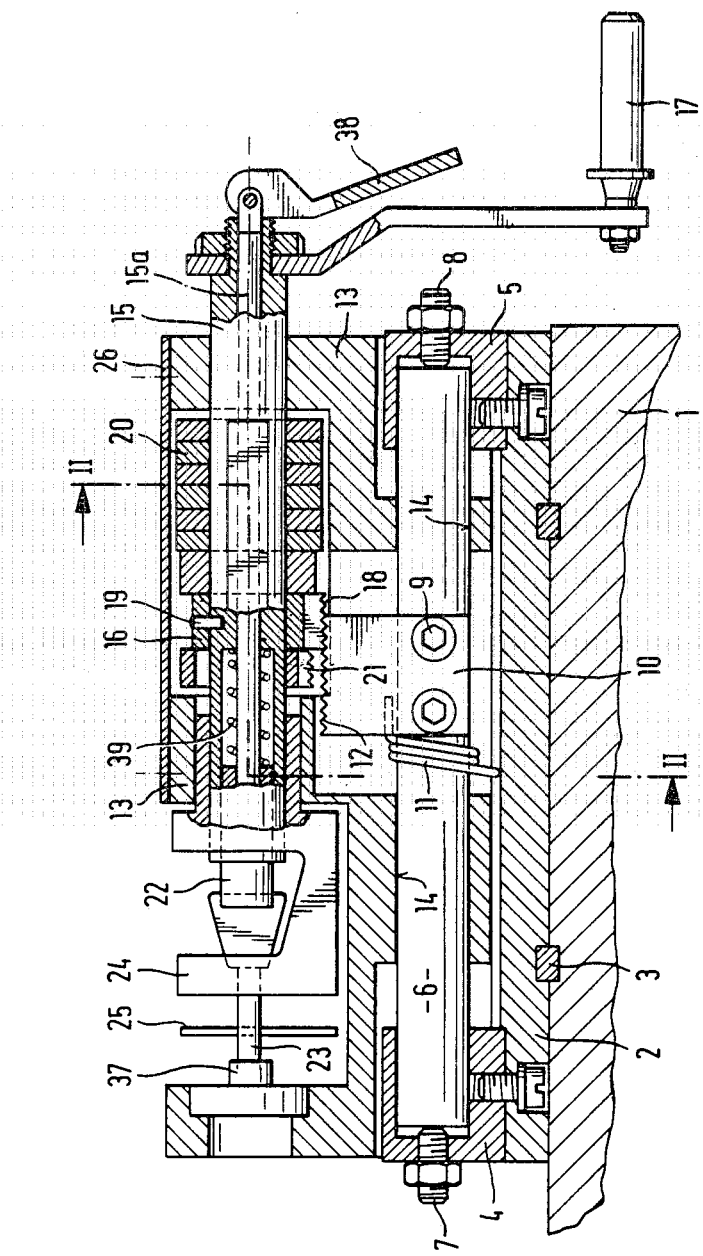

United States Patent [19]

Tyynelä et al.

[11] Patent Number: 4,544,310
[45] Date of Patent: Oct. 1, 1985

[54] CLUTCH AND TRANSMISSION MECHANISM

[75] Inventors: Esko Tyynelä, Reijola; Tuomo Pitkänen, Joensuu, both of Finland

[73] Assignee: Oy Wartsila Ab, Helsinki, Finland

[21] Appl. No.: 513,157

[22] Filed: Jul. 12, 1983

[30] Foreign Application Priority Data

Jul. 19, 1982 [FI] Finland ................... 822535

[51] Int. Cl.$^4$ ................... B23C 3/35
[52] U.S. Cl. ................... 409/82; 51/101 R; 51/219 PC; 74/84 R; 74/424.6; 192/33 R; 192/35; 192/92; 192/93 C; 409/145; 409/155
[58] Field of Search ................... 409/81, 82, 83, 165, 409/166, 167, 168, 225, 226, 145, 159, 155, 162, 163; 408/70, 91; 51/219 PC, 101 R, 123 R; 76/110; 192/33 R, 34, 35, 92, 97, 96, 95, 93 C, 93 A; 74/84 R, 424.5, 424.6, 426

[56] References Cited

U.S. PATENT DOCUMENTS

| | | | |
|---|---|---|---|
| 1,459,796 | 6/1923 | Penney et al. | 74/84 R |
| 2,099,724 | 11/1937 | Cogsdill | 51/219 PC X |
| 2,325,364 | 7/1943 | Boening | 51/219 PC |
| 2,368,342 | 1/1945 | Zwick | 51/219 PC |
| 2,391,317 | 12/1945 | Klein | 51/101 R |
| 2,445,194 | 7/1948 | Umbdenstock | 51/219 PC X |
| 2,781,880 | 2/1957 | Walz | 192/33 R |
| 2,958,167 | 11/1960 | Mueller | 51/219 PC X |
| 3,440,906 | 4/1969 | Allen | 409/84 X |
| 3,633,717 | 1/1972 | Stair et al. | 192/96 |
| 4,261,142 | 4/1981 | Nixon et al. | 51/219 PC X |

Primary Examiner—William R. Briggs
Assistant Examiner—Glenn L. Webb
Attorney, Agent, or Firm—John Smith-Hill

[57] ABSTRACT

A mechanism for machining an object, such as a key blank, to a desired shape at a plurality of successive positions in an axial direction of the object, includes a holder for the object. The holder is axially movable by means of a transfer mechanism with a rotatable shaft. There is a feeder member connected to the rotatable shaft and cooperating with a clutch device axially stationary relatively to the holder. Cooperating guiding surfaces are arranged to transmit to the holder an axial movement during a limited turning of the rotatable shaft. This turning is only a small portion of a full turn of the rotatable shaft. The machining of the object takes place as a continuous guided operation during such a turning of the rotatable shaft which is separate from the turning thereof causing the holder to move axially.

12 Claims, 4 Drawing Figures

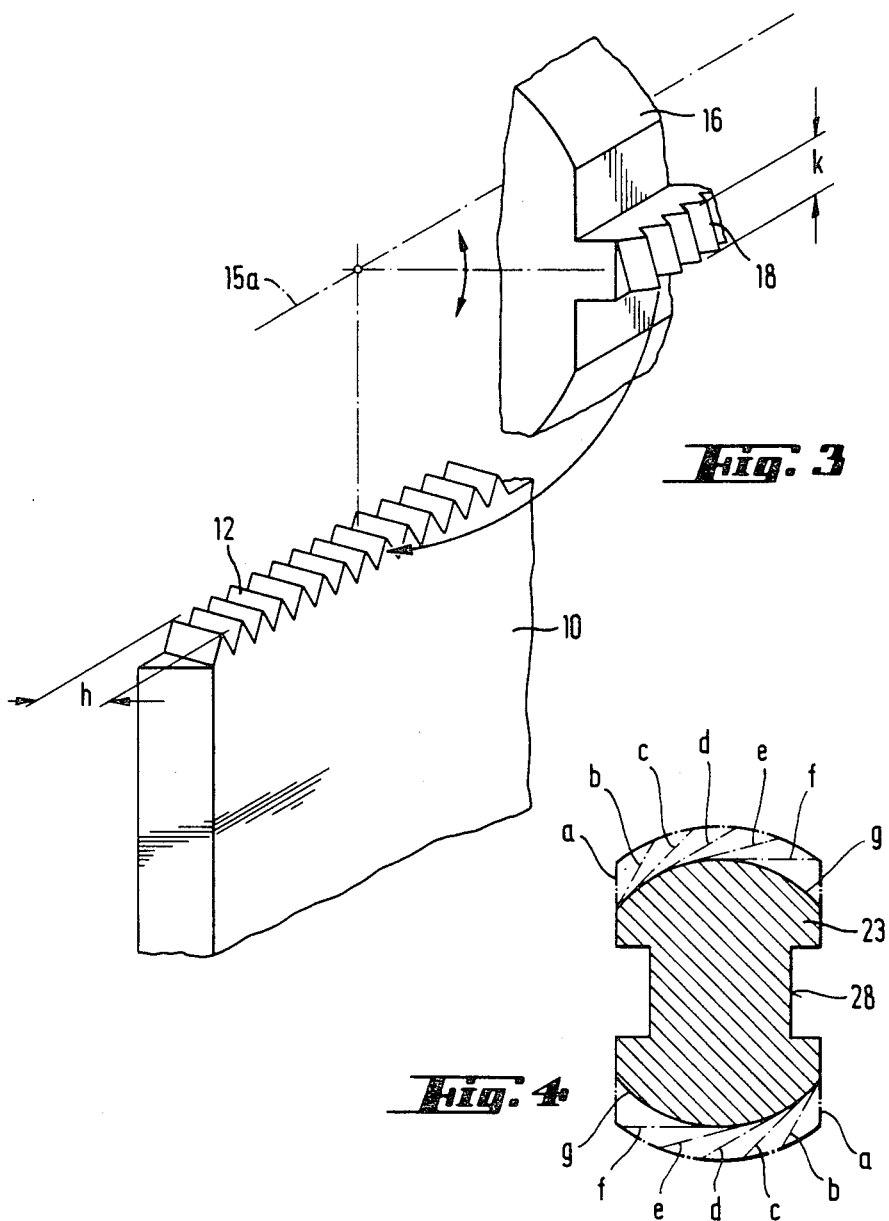

CLUTCH AND TRANSMISSION MECHANISM

The invention relates to a mechanism for machining an object, for example a key blank, to a desired shape at a plurality of successive positions in an axial direction of the object, in which mechanism axial feed of the object is obtained by rotating a shaft.

In a machine tool, for example a mechanism for axial positioning of a mill cutter used for milling the combination surfaces of a key, the mechanism is expected to have a high setting accuracy, and hence, also small clearances in the setting direction. On the other hand, in order to obtain a satisfactory working speed, the friction forces of the setting mechanism should be small. In the known art, corresponding mechanisms have been made complicated, expensive to produce and difficult to use.

One object of the invention is to provide a machining mechanism, which is simple and inexpensive. Another object is to provide a mechanism, by means of which it is possible to make, with great accuracy, repeated axial adjustments as well as position adjustments of the object to be machined relatively to the working tool. The characteristic features of the invention are stated in claim 1. With such a construction a simple apparatus specially suitable as a key combination mill is obtained.

In a preferred embodiment of the invention, the machining tool is stationarily journalled and the distance between the object to be machined and the tool is adjusted by swinging the object holder about a support shaft. The swinging of the object holder can with advantage be governed by a cam mechanism, including several cam discs. A proper cam disc is chosen for each machining position in order to produce the wanted machining form. The cam action may work against a spring load for obtaining a more reliable function. Axial adjustment of the object can be obtained by a helix transmission mechanism requiring a turning angle of only 15°, preferably only 10°. If the guiding portion of the guiding helix is made short enough, the helix can be simplified and formed as a linear surface, for example, as a row of linear teeth.

Figure 2:
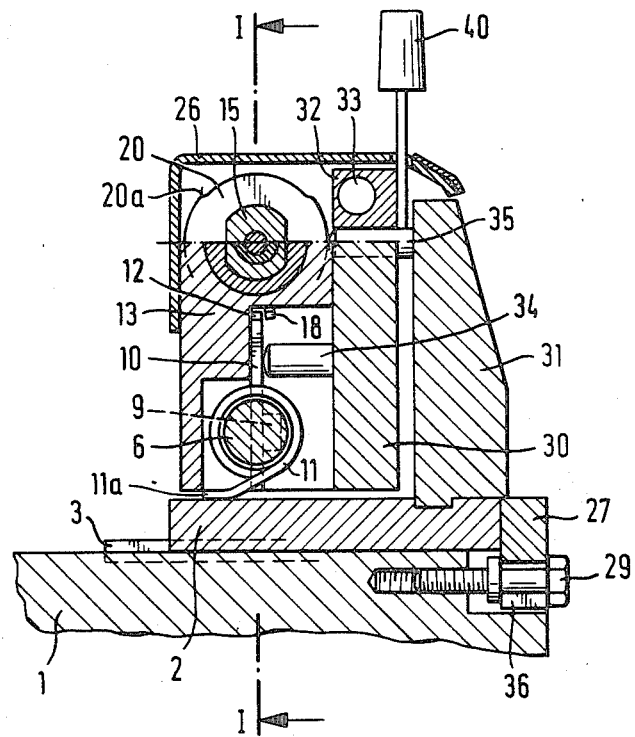

The invention will now be described, by way of example, with reference to the accompanying drawing, in which FIG. 1 is a longitudinal section of an apparatus according to the invention, FIG. 2 is section II—II of FIG. 1, FIG. 3 is a schematic perspective view of the clutch and power transmission members of the apparatus of FIG. 1, FIG. 4 is a schematic key blank milling plan.

In FIGS. 1 and 2, a milling cutter for key blanks is shown, in which a key blank 23 is milled by a stationary rotating cutter 25, which in FIG. 1 is behind the drawing plane. The machine has a frame 1. At its upper level there is a slide 2 moving perpendicularly to the plane of FIG. 1. By means of the slide 2, the distance between the key blank 23 and the cutter 25 is adjusted. The movement of the slide 2 is guided by the slide bars 3. A shaft 6 is rotatably journalled in holder members 4 and 5 attached to the slide 2. The axial position of the shaft 6 is determined by two adjustment screws 7 and 8. The shaft 6 carries a support 13 holding the key blank 23. The support 13 is, guided by its bores 14, turnable and slidable on the shaft 6. A guide plate 10 is with screws 9 attached in a recess in the center portion of the shaft 6. The shaft 6 is provided with a helical spring 11, the free end of which is in FIG. 1 behind the guide plate 10 and transmits torque thereto. At the upper edge of the plate 10 there is a toothed surface with short linear teeth 12.

The support 13 moves the key blank 23 axially and also adjusts the distance between the blank and the cutter 25 in order to effectuate the desired form of milling. Both movements are carried out by rotating a shaft 15 rotatably journalled in the support 13. The shaft 15 is manually rotated from a crank 17. The shaft carries a feeder member 16, which gives the support 13 an axial movement by means of a toothed surface with oblique teeth 18 meshing in a certain phase of the rotation of the shaft 15 with the teeth 12 of the guide plate 10. The feeder member 16 is locked to the shaft 15 with a pin 19. The axial position of the support 13 is determined during part of the rotation of the shaft 15 by the toothed surface 18 and during the rest of the rotation of the shaft 15 by a clutch member 21, which is operated by the feeder member 16, and is urged by a spring (not shown) so that it is automatically clutched to the teeth 12 of the guide plate 10, when the teeth 18 of the feeder member 16 are turned out of mesh with the teeth 12. The clutch member 21 is so fitted, for example journalled on a horizontal shaft (not shown) in the support 13, that it is able to move vertically relatively to the guide plate 10. The movements of the clutch member 21 are preferably governed by a simple spring and cam mechanism (not shown). The operating cam can be in the guide plate 16. Axial positioning of the guide plate 10 relatively to the feeder member 16 is made by adjusting the shaft 6 axially with the adjustment screws 7 and 8.

To hold the key blank 23 there is a spring loaded holder 22, axially movable in the shaft 15, a central support 24 and an end support 37. There is a release lever 38 for retracting the holder 22 against the power of its load spring 39, in order to release the key blank 23.

FIG. 2 shows how positioning of the slide 2 and the swinging movement of the support 13 is carried out. The movement of the slide 2 is effectuated by a flanged adjustment screw 29 received in a recess 36 in an adjustment support plate 27, attached to the slide 2. By turning the screw 29, the datum distance between the key blank 23 and the cutter 25 is set, for instance, after replacement of the cutter.

The support 13 has a swinging body portion 30 cooperating with a back support 31 which is rigid with the slide 2. The body portion 30, which is rigid with the portion of the support 13 shown in FIG. 1, swings on the shaft 6. This swinging movement of the portion 30 is guided by a selected cam disc 20 fitted on the rotatable shaft 15. The body 30 includes two guide bars 33, of which the upper one is shown in FIG. 2. A setting slide 32 moves along the guide bars 33. The setting slide 32 includes an axially slidable follower pin 35, which by adjusting the position of the setting slide 32 is moved in the direction of the shaft 15 to the position of a selected cam disc 20. One end of the pin 35 follows the guiding surface 20a of the selected cam disc and its opposite end is urged against the back support 31. The spring 11, acting through the plate 10 and a support pin 34 attached to the body portion 30 urges the support 13 to swing around the shaft 6 and thus presses the guiding surface 20a of the selected cam disc 20 against the pin 35. The cam discs 20 follow the rotational movement of the shaft 15, whereby the swinging movement of the support 13 on the shaft 6 is determined by the guiding surface 20a of the selected cam disc.

The guide plate 10 has a running fit between the support pin 34 and the left-side portion of the support 13 as shown in FIG. 2. Thus, the support 13 can move axially on the shaft 6 relative to the guide plate 10. The end 11a of the spring 11 is supported by the slide 2. The torque exerted by the spring 11 is transferred to the guide plate 10 and by the support pin 34 to the support 13. The axial movement of the setting slide 32 is carried out manually by using a setting lever 40. A protecting cover 26 is attached to the support 13 and has a slot allowing setting of the lever 40. In the slot, there are transverse recesses for exact axial positioning of the setting slide 32 and the operating pin 35 relatively to the cam discs 20.

In the shown embodiment of the invention, the key blank 23 can, at each milling position, be milled in six different ways for producing a proper key combination cut. Shifting from one milling position to another is made by rotating the shaft 15 by the crank 17 one full turn, that is, over the position, where the teeth 18 mesh with the teeth 12. Since both the feeder member 16 and the guide plate 10 have just a narrow toothed portion, the axial movement of the support 13 requires only a small turning angle. The position of this angle is so chosen, that the key blank, in the position where the teeth mesh, turns its one side towards the cutter 25, that is, a portion where no milling is made. This makes the axial movement possible, since the key blank is completely out of contact with the cutter 25. By using, in successive order, the guiding action of all the cam discs 20, the desired milling is obtained at each milling position, and the key blank is provided with a complete series of key combination cuts. The cam discs 20 rotate due to the cranking of the shaft 15. Their rotating speed is thus manually adjusted to suit the capacity of the cutter 25. The set of cam discs 20 is replaceably fitted on the shaft 15 and can be replaced if required.

FIG. 3 is a schematic perspective view of the feeder member 16 and its cooperation with the guide plate 10. The center line of the shaft 15 is indicated by 15a. Since the oblique teeth 12 of the guide plate 10 are very short, they can be made linear, although the theoretically right form would be a helix. The teeth 18 of the feeder member 16 correspond to the teeth 12. Rotating the shaft 15 brings the feeder member 16 and the guide plate 10 into contact over a distance, which is the sum of the influence distance h of the guide plate 10, measured in the turning direction of the shaft 15, and the influence distance k of the feeder member 16. The influence distances h and k are so chosen, that they correspond to a turning of the shaft 15 of at the most 15°, preferably at the most 10°. During the meshing of the teeth 12 and 18, the support 13 moves along the shaft 6 a distance corresponding to the toothing pitch, for example 1...3 mm, preferably 1.6 mm. Every full turn of the shaft 15 thus gives the support 13 and the key blank 23 a pitch movement, which corresponds to the desired axial distance between the key combination cuts. When the teeth 12 and 18 are out of mesh, the clutch member 21 automatically keeps the support 13 axially locked.

FIG. 4 shows a feasible key blank cross-section and cutting. The key profile has two longitudinal guiding grooves 28, one at each side. The combination surfaces are indicated with letters a...g. Position a means a zero cut, that is, no cut at all has been made, position b a one step cut, position c a two step cut, etc. Thus, position g means that the machining allowance portion of the key blank has been completely removed. In the shown embodiment, the cuts are made at both narrow sides of the flat shank of a key blank, that is, the upper and lower sides of a key profile shown in FIG. 4. The cuts can then be made symmetrically, so that cuts of equal size are made at opposite sides of the key. However, this is not necessary, since non-symmetric cutting also is feasible. The form and size of each cut is determined by the form of the selected cam disc 20.

The invention is not restricted only to the described embodiments, but several variations and modifications thereof are feasible within the scope of the attached claims.

We claim:

1. A mechanism for receiving an elongated object, such as a key blank, that is to be machined to a desired shape at a plurality of successive positions in an axial direction of said object, comprising a frame, a holder for carrying the object in a predetermined orientation with respect to the frame, and a transfer device for moving the holder with respect to the frame in the axial direction of the object when carried in said predetermined orientation, said transfer device comprising:

a support which is mounted to the frame so as to be movable with respect thereto in the axial direction of the object when carried in said predetermined orientation;

a shaft mounted in the support to rotate about an axis of rotation aligned with the direction of movement of the support but being fixed against axial movement relative to the support, the shaft being connected to the holder for transmitting rotational movement thereto;

a first clutch member which is stationary relative to the support with respect to the axial direction of the shaft;

a second clutch member which is stationary relative to the frame with respect to the axial direction of the shaft and is engageable by the first clutch member to lock the shaft and the support against axial movement relative to the frame; and a feeder member which is connected to the rotatable shaft and which co-operates with the first clutch member so that said first clutch member is disengaged from the second clutch member during only a small range of angular positions of the rotatable shaft, thereby permitting axial movement of the rotatable shaft and the support during said small range of angular positions, and is engaged with the second clutch member, thereby preventing axial movement of the rotatable shaft and the support, at angular positions of the shaft outside said small range of angular positions, said feeder member engaging the second clutch member during only said small range of angular positions of the rotatable shaft, whereby co-operating guiding surfaces of the feeder member and of the second clutch member transmit an axial movement to the rotatable shaft and to the support during rotation of the shaft through said small range of angular positions.

2. A mechanism according to claim 1, comprising a second shaft mounted in the frame with its central axis parallel to, but spaced from, the axis of rotation of the rotatable shaft, said support being mounted to the frame by means of said second shaft.

3. A mechanism according to claim 2, wherein the support is swingable with respect to the frame about the central axis of the second shaft, whereby the distance between an object carried by the holder and a tool which is stationary relative to the frame may be adjusted.

4. A mechanism according to claim 3, comprising a cam disc for controlling swinging movement of the support.

5. A mechanism according to claim 3, wherein the engagement of the first and second clutch members between axial movements of the rotatable shaft and the support caused by the co-operating guiding surfaces of the feeder member and of the second clutch member defines a plurality of discrete machining positions for the support, and wherein the mechanism comprises several cam discs for controlling swinging movement of the support, and a positioning device for selecting one of the several cam discs, whereby the swinging movement of the support in each of its machining positions depends on the selected cam disc.

6. A mechanism according to claim 5, wherein the cam discs are mounted on the rotatable shaft, and the positioning device is movable axially of the rotatable shaft for selecting a cam disc and comprises a cam follower which engages the peripheral surface of the selected cam disc, and the mechanism further comprises a reaction member which is fixed relative to the frame and is engaged by the cam follower, whereby the configuration of the peripheral surface of the selected cam disc controls swinging movement of the support.

7. A mechanism according to claim 6, comprising a spring member effective between the frame and the support to maintain the peripheral surface of the selected cam disc in contact with the cam follower.

8. A mechanism according to claim 4, wherein the cam disc has a guiding surface for controlling swinging movement of the support, and the mechanism comprises a spring member effective between the frame and the support to cause the swinging movement of the support to follow the guiding surface of the cam disc.

9. A mechanism according to claim 1, wherein said small range of angular positions is at most 15°.

10. A mechanism according to claim 9, wherein said small range of angular positions is at most 10°.

11. A mechanism according to claim 1, wherein the co-operating guiding surfaces are linear.

12. A mechanism according to claim 1, in combination with a tool which is stationary relative to the frame and an object carried by the holder, the object having a cross-sectional shape such that machining thereof by the tool takes place only while the shaft and the support are locked against axial movement, and the object is disengaged from the tool while the first clutch member is disengaged from the second clutch member.

* * * * *